US012638146B1

(12) United States Patent
Zheng

(10) Patent No.: US 12,638,146 B1
(45) Date of Patent: May 26, 2026

(54) DOWNLIGHT

(71) Applicant: Hangzhou Juxing Intelligent Technology Co., Ltd., Hangzhou (CN)

(72) Inventor: Hongbing Zheng, Hangzhou (CN)

(73) Assignee: Hangzhou Juxing Intelligent Technology Co., Ltd., Hangzhou (CN)

(*) Notice: Subject to any disclaimer, the term of this patent is extended or adjusted under 35 U.S.C. 154(b) by 0 days.

(21) Appl. No.: 19/095,075

(22) Filed: Mar. 31, 2025

(30) Foreign Application Priority Data

Mar. 6, 2025 (CN) ........................ 202520388718.6

(51) Int. Cl.
*F21S 8/02* (2006.01)
*F21S 4/24* (2016.01)
*F21V 17/16* (2006.01)
*F21Y 107/10* (2016.01)
*F21Y 115/10* (2016.01)

(52) U.S. Cl.
CPC ................ *F21S 8/026* (2013.01); *F21S 4/24* (2016.01); *F21V 17/162* (2013.01); *F21V 2200/20* (2015.01); *F21Y 2107/10* (2016.08); *F21Y 2115/10* (2016.08)

(58) Field of Classification Search
CPC ..... F21S 8/026; F21S 4/22; F21S 4/24; F21V 17/162; F21V 17/164; F21V 17/005; F21V 21/047; F21V 15/01; F21V 23/002; F21V 2200/20; F21Y 2107/20; F21Y 2107/70; F21Y 2115/10; F21Y 2107/10; F21Y 2105/18
See application file for complete search history.

(56) References Cited

U.S. PATENT DOCUMENTS

| | | | | |
|---|---|---|---|---|
| 10,724,711 B1 * | 7/2020 | Hou | ...................... | F21V 31/005 |
| 2019/0324182 A1 * | 10/2019 | Liu | ........................ | G02B 6/009 |
| 2022/0065410 A1 * | 3/2022 | Huang | .................. | F21V 23/008 |
| 2025/0264213 A1 * | 8/2025 | Li | ........................... | F21S 8/026 |

FOREIGN PATENT DOCUMENTS

| | | | | |
|---|---|---|---|---|
| CN | 202101102 U | * 1/2012 | | |
| CN | 103411190 A | * 11/2013 | | |
| CN | 118031166 A | * 5/2024 | ............. | F21V 23/06 |

* cited by examiner

*Primary Examiner* — Erin Kryukova
(74) *Attorney, Agent, or Firm* — IPRTOP LLC

(57) ABSTRACT

Provided is a downlight including a back cover, a face ring, and a flexible light strip. The back cover includes a bottom surface and a first annular sidewall connected to the periphery of the bottom surface, the back cover is made of metal. The face ring includes an axially extending second annular sidewall, the first annular sidewall surrounds an outer side of the second annular sidewall and contacts an outer wall surface of the second annular sidewall, the face ring is made of plastic. The flexible light strip is fixed to an inner wall surface of the second annular sidewall. The composite structure of the metal back cover enclosing the plastic face ring fully leverages the high thermal conductivity of metal while utilizing plastic to reduce overall costs, achieving synergistic optimization of thermal performance and manufacturing costs.

9 Claims, 3 Drawing Sheets

DOWNLIGHT

FIELD OF TECHNOLOGY

The present disclosure belongs to the technical field of lighting equipment, specifically relating to a downlight.

BACKGROUND

As a recessed ceiling-mounted directional luminaire, LED downlights have been widely applied in residential and commercial space lighting (e.g., bedrooms, living rooms, bathrooms) due to their soft illumination and high space utilization efficiency. Through the combined design of light sources, light guide plate and diffusion plate, the LED downlights achieve diversified lighting effects while reducing spatial constraints and creating warm ambiances, making them essential solutions in modern interior lighting.

Current mainstream recessed ultra-thin downlights predominantly adopt full-metal structures (e.g., aluminum back covers and face rings), primarily relying on the high thermal conductivity of metallic materials for passive heat dissipation of LED light sources. However, such solutions exhibit significant drawbacks. Connections between metal components require screw fixation, which not only increases the number of components but also complicates production and assembly processes, significantly elevating labor costs. Some manufacturers attempt to replace metal with full-plastic materials to reduce manufacturing costs. Yet plastics exhibit extremely low thermal conductivity (typically below 1 W/m·K), failing to meet heat dissipation requirements for LED beads and potentially causing accelerated lumen depreciation and shortened lifespan. Additionally, plastic components demonstrate weaker structural strength, making reliable screwless assembly difficult to achieve.

SUMMARY

The present disclosure provides a downlight, which balances thermal performance, manufacturing cost, and assembly efficiency.

The downlight of the present disclosure includes a back cover, a face ring, and a flexible light strip. The back cover includes a bottom surface and a first annular sidewall connected to the periphery of the bottom surface, the back cover is made of metal. The face ring includes an axially extending second annular sidewall, the first annular sidewall surrounds an outer side of the second annular sidewall and contacts an outer wall surface of the second annular sidewall, the face ring is made of plastic. The flexible light strip is fixed to an inner wall surface of the second annular sidewall.

In some embodiments, a free end of the first annular sidewall is bent outward to form a rolled edge, and the first annular sidewall is provided with multiple spaced notches. An outer wall surface of the second annular sidewall is provided with protrusions corresponding in quantity and position to the notches, the protrusions are configured to engage the notches to form a snap-fit connection, thereby fixing the first annular sidewall to the second annular sidewall.

In some embodiments, the protrusions include a first protrusion and a second protrusion. A lower surface of the first protrusion is provided with a horizontal abutment surface to abut against the bottom surface of the corresponding notch. An upper surface of the second protrusion is provided with a horizontal abutment surface to abut against the top surface of the corresponding notch.

In some embodiments, a plurality of first protrusions and second protrusions is provided, and the first protrusions and the second protrusions are alternately arranged along a circumferential direction of the second annular sidewall, forming a dual snap-fit retention structure.

In some embodiments, the downlight further includes at least one pair of spring fixing structures. Each of the spring fixing structures includes a protrusion portion, an insertion tab, and a hook. The protrusion portion is integrally formed on the bottom surface of the back cover. The insertion tab is arranged parallel to the protrusion portion, a gap between the insertion tab and the protrusion portion forms an insertion channel. The hook is disposed at an end of the protrusion portion near an exit of the insertion channel. A spring arm of a spring is configured to pass through the insertion channel and engage an end face of the hook, thereby fixing the spring to the back cover.

In some embodiments, the insertion tab is provided with an arc-shaped recess near the exit of the insertion channel, and a curvature of the arc-shaped recess matches a bending path of the spring arm to guide the spring arm through the insertion channel.

In some embodiments, the hook includes an inclined guide surface and a limiting end face; the inclined guide surface extends obliquely from the exit of the insertion channel toward the limiting end face, to guide the spring arm to slide along an inclined direction and engage the limiting end face.

In some embodiments, the downlight further includes a mating cable. The mating cable includes a rear clamp and a wire body. The rear clamp is embedded in a compression zone between the first annular sidewall and the second annular sidewall and fixed by a compression force generated between the first annular sidewall and the second annular sidewall.

In some embodiments, the downlight further includes a light guide plate and a diffusion plate. The light guide plate is disposed forward of a light-emitting direction of the flexible light strip and fixedly connected to the inner wall surface of the second annular sidewall, configured to uniformly guide light emitted by the flexible light strip toward the light-emitting direction. The diffusion plate is disposed between the flexible light strip and the light guide plate and fixedly connected to the inner wall surface of the second annular sidewall, configured to scatter and homogenize the light emitted by the flexible light strip.

In some embodiments, the downlight further includes reflective paper disposed rearward of the light-emitting direction of the flexible light strip and fixedly connected to the inner wall surface of the second annular sidewall, configured to reflect backward-scattered light from the flexible light strip toward the light guide plate or the diffusion plate.

The downlight of the present disclosure provides the following beneficial effects.

(1) Through a composite structure where a metal back cover encloses a plastic face ring, the design fully leverages the high thermal conductivity of metal (heat dissipation path: light strip→plastic face ring→metal back cover) while utilizing plastic to reduce overall costs. This overcomes the dual technical limitations of high-cost all-metal solutions and poor heat dissipation in all-plastic designs, achieving synergistic optimization of thermal performance and manufacturing costs.

(2) The snap-fit connection structure and screw-free spring fixing design replace traditional screw-based assembly methods. Specifically, the snap-fit structure employs dual retention via protrusions and notches to enable rapid locking and anti-loosening between metal and plastic components. The spring-hook structure utilizes inclined guide surfaces and arc-shaped recesses to achieve precise spring guidance and self-locking fixation.

(3) By indirectly fixing the flexible light strip to the plastic face ring and adopting a compression-based insulation design for the mating cable's rear clamp, the light strip avoids direct contact with the metal back cover, leveraging the natural insulation of the plastic face ring to eliminate electrical leakage risks. The rear clamp is embedded in the metal/plastic compression zone, preventing short-circuit hazards caused by exposed wires.

(4) Through the horizontal wiring layout and the metal back cover's integrated stamped structure, the design eliminates cavity space occupied by traditional vertical wiring and standalone spring seats. The overall height of the downlight is minimized, meeting market demands for ultra-thin recessed lighting.

REFERENCE NUMERALS

1 Back Cover
11 Bottom Surface
12 First Annular Sidewall
2 Face Ring
21 Second Annular Sidewall
3 Flexible Light Strip
4 Notch
5 Protrusion
61 Protrusion Portion
62 Insertion Tab
621 Arc-shaped Recess
63 Hook
631 Inclined Guide Surface
632 Limiting End Face
64 Spring
65 Spring Arm
7 Mating Cable
71 Rear Clamp
72 Wire Body
8 Light Guide Plate
9 Diffusion Plate
10 Reflective Paper

DETAILED DESCRIPTION

The embodiments of the present disclosure will be described below through exemplary embodiments. It should be understood that the examples and embodiments described herein are for illustrative purposes only and that various modifications or changes in light thereof will be suggested to persons skilled in the art and are to be included within the spirit and purview of this application. Such alterations, modifications, and improvements are intended to be part of this disclosure, and are intended to be within the spirit and scope of the disclosure.

It needs to be stated that the drawings provided in the following embodiments are just used for schematically describing the basic concept of the present disclosure, thus only illustrating components related to the present disclosure and are not drawn according to the numbers, shapes and sizes of components during actual implementation, the configuration, number and scale of each component during actual implementation thereof may be freely changed, and the component layout configuration thereof may be more complicated.

Furthermore, descriptions such as "first", "second", and the like in the present disclosure are used for illustrative purposes only and should not be interpreted as indicating or implying relative importance or implicitly specifying the number of technical features. As a result, a feature defined as "first" or "second" may explicitly or implicitly include at least one such feature. In addition, the technical solutions between the various embodiments can be combined with each other, provided such combinations are feasible for the person skilled in the art. If combinations result in contradictions or implementation failures, such combinations shall be deemed non-existent and outside the scope of protection claimed by the present disclosure.

The present embodiment provides a downlight having a novel downlight structure that balances heat dissipation performance, manufacturing cost, and assembly efficiency. This design breaks through the technical limitations of single-material (metal or plastic) solutions while ensuring ultra-thin dimensions and safety.

Figure 1:
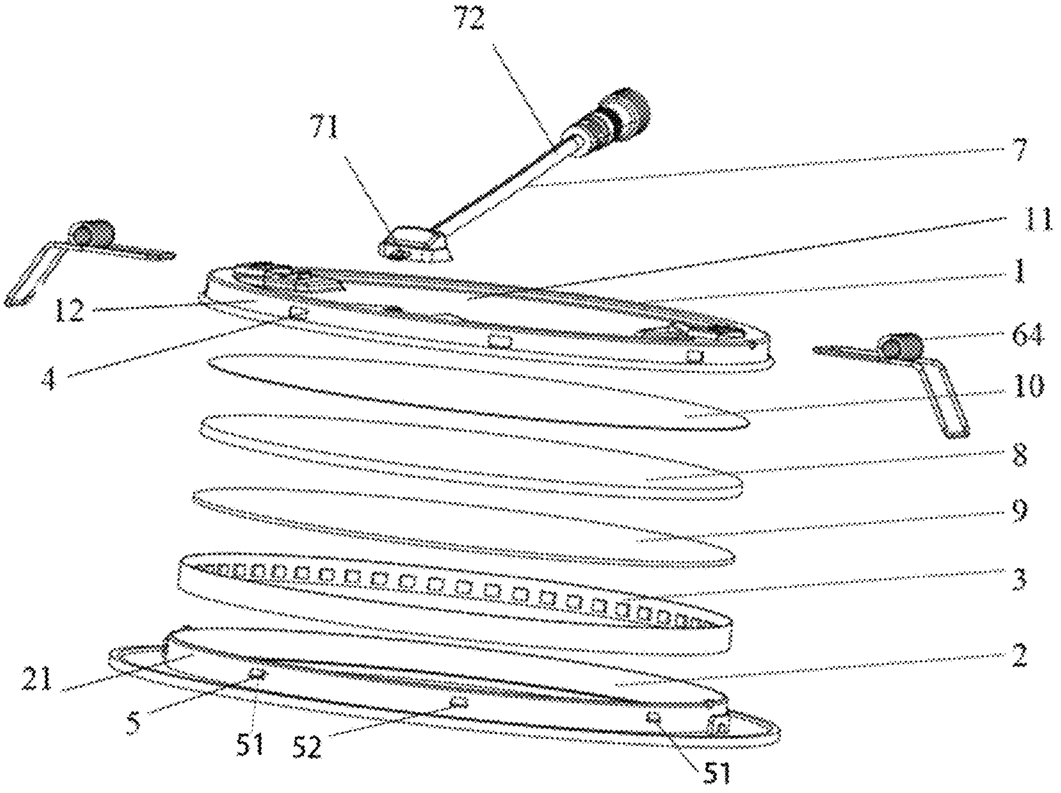
FIG. 1 shows an exploded view of a downlight according to an embodiment of the present disclosure.

As shown in FIG. 1, this embodiment provides a downlight including a metal back cover 1, a plastic face ring 2, and a flexible light strip 3. The structural details and assembly relationships of these components are described below with reference to the drawings.

The back cover 1 includes a bottom surface 11 and a first annular sidewall 12 connected to the periphery of the bottom surface 11. The back cover 1 is made of metal.

Specifically, the back cover 1 is an integrally formed aluminum alloy stamping structure, including a circular bottom surface 11 and the first annular sidewall 12 vertically extending upward from the periphery of the bottom surface.

In some embodiments, the top end of the first annular sidewall 12 is bent radially outward to form an annular rolled edge. A bending direction of the annular rolled edge forms an acute angle with the plane of the bottom surface 11, thereby creating an assembly guide slope.

The first annular sidewall 12 is circumferentially equidistantly provided with multiple rectangular notches 4. These notches 4 penetrate the inner and outer wall surfaces of the first annular sidewall 12, and are evenly distributed on the first annular sidewall 12. The width of each notch 4 is slightly greater than that of protrusions 5 (described later), providing tolerance compensation space during assembly.

The face ring 2 includes an axially extending second annular sidewall 21. The first annular sidewall 12 surrounds the outer side of the second annular sidewall 21 and contacts its outer wall surface. The face ring 2 is made of plastic.

Figure 2:
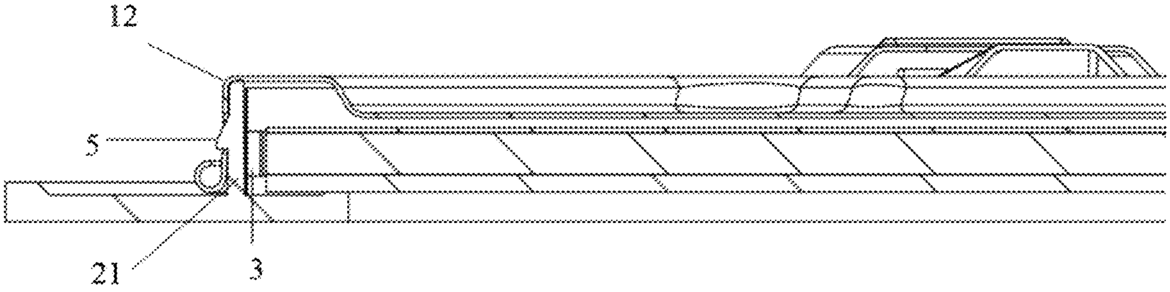
FIG. 2 shows a cross-sectional view of a first annular sidewall enclosing a second annular sidewall according to an embodiment of the present disclosure.

Specifically, as shown in FIG. 2, the face ring 2 is an annular component injection-molded from PBT engineering plastic, including a horizontally extending annular base and the second annular sidewall 21 axially extending upward from the outer edge of the base. The outer diameter of the second annular sidewall 21 is smaller than the inner diameter of the first annular sidewall 12, forming a clearance fit that allows the second annular sidewall 21 to be nested inside the first annular sidewall 12.

In some embodiments, protrusions 5 corresponding in quantity and position to the notches 4 are provided on the outer wall surface of the second annular sidewall 21. The protrusions 5 include a first protrusion 51 and a second protrusion 52.

The first protrusion 51 was located on the lower portion of the outer wall surface of the second annular sidewall 21, with a horizontal abutment surface on its lower face. The second protrusion 52 was located on the upper portion of the outer wall surface of the second annular sidewall 21, with a horizontal abutment surface on its upper face.

Furthermore, a plurality of first protrusions 51 and second protrusions 52 is provided. The first and second protrusions are alternately distributed circumferentially, with an axial spacing between each pair of the first and second protrusions matching the height of the notches 4. The top of each protrusion 5 is provided with a guide slope to direct the first annular sidewall into locking positions during assembly.

During assembly, the second annular sidewall 21 of the face ring 2 is inserted into the first annular sidewall 12 of the back cover 1. Pressing aligns the notches 4 with the corresponding protrusions 5. As the first annular sidewall is pressed downward along the guide slope, the horizontal abutment surfaces of the first and second protrusions engage with the bottom and top surfaces of notches 4 respectively, forming bidirectional axial retention.

In this state, the inner wall surface of the first annular sidewall 12 and the outer wall surface of the second annular sidewall 21 establish surface contact, creating a heat conduction path from the face ring 2 to the back cover 1. The inner sidewall of the first annular sidewall generates elastic compressive force against the outer wall surface of the second annular sidewall 21, further eliminating assembly gaps.

In this embodiment, the circumferentially alternating first and second protrusions create dual locking retention, where bidirectional locking forces counteract displacements caused by thermal expansion/contraction or vibration. The circumferentially alternating arrangement also evenly distributes assembly stresses, preventing localized creep in plastic components. Additionally, bidirectional retention allows minor dimensional deviations between the face ring and back cover without compromising locking engagement.

A flexible light strip 3 is fixed to the inner wall surface of the second annular sidewall 21.

Specifically, the flexible light strip 3 is adhered to the inner wall surface of the second annular sidewall 21 via a high-temperature-resistant adhesive layer. Since the plastic material of the face ring 2 provides inherent insulation, and the flexible light strip 3 has no direct contact with the metal back cover 1, the risk of electric leakage is eliminated.

The heat dissipation path is as follows: heat generated by the flexible light strip 3 is conducted through the high-temperature-resistant adhesive layer to the plastic face ring 2, then transferred via the contact interface between the face ring 2 and back cover 1 to the metal back cover 1, and finally dissipated through air convection via the bottom surface 11 and first annular sidewall 12 of the back cover 1.

In this embodiment, the composite structure of the metal back cover enclosing the plastic face ring fully leverages the high thermal conductivity of metal while utilizing plastic to reduce overall costs. This design overcomes the dual technical limitations of high-cost all-metal solutions and poor heat dissipation in all-plastic designs, achieving synergistic optimization of thermal performance and manufacturing costs.

Figure 3:
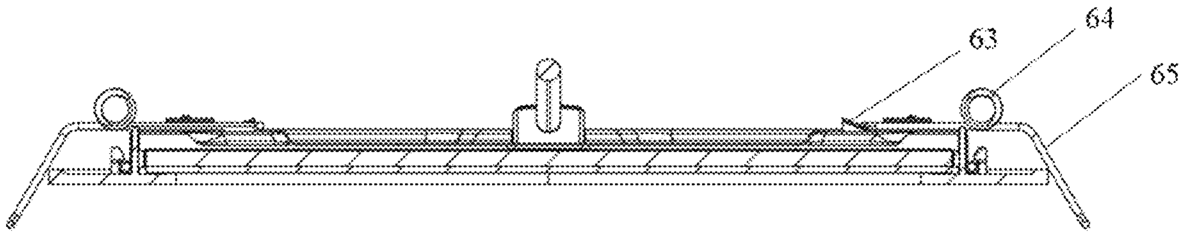
FIG. 3 shows a schematic diagram of a spring fixing structure according to an embodiment of the present disclosure.
Figure 4:
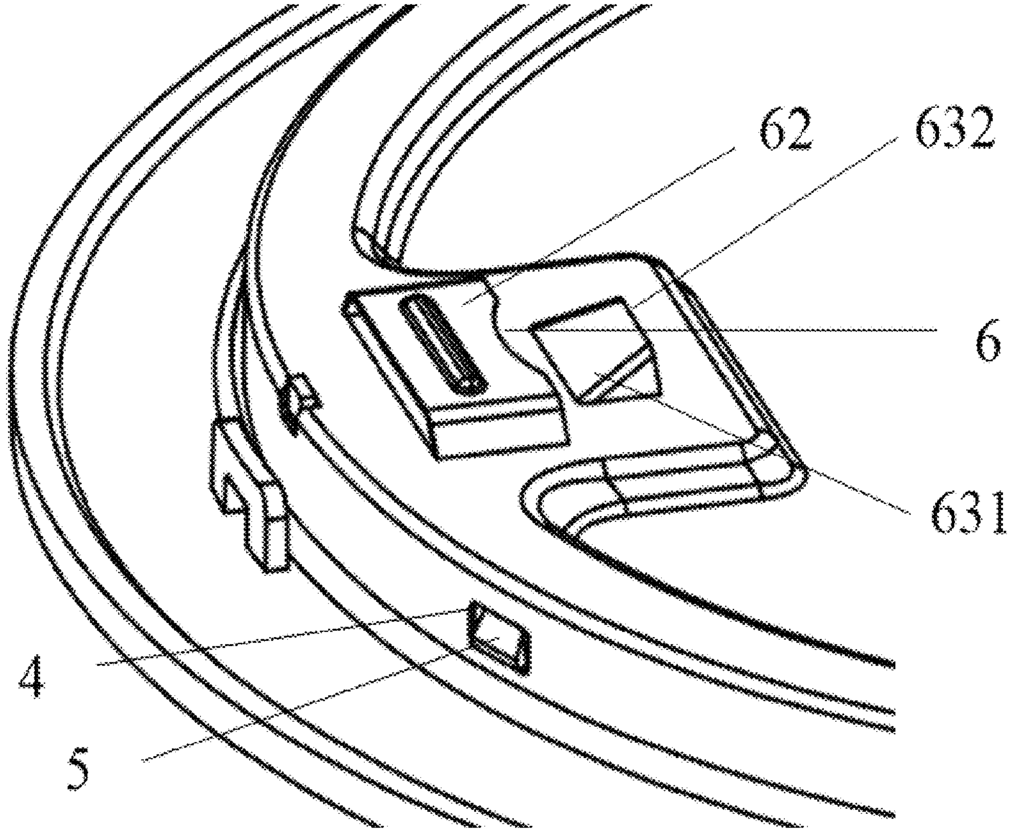
FIG. 4 shows a schematic diagram of the spring fixing structure without an engaged spring according to an embodiment of the present disclosure.
Figure 5:
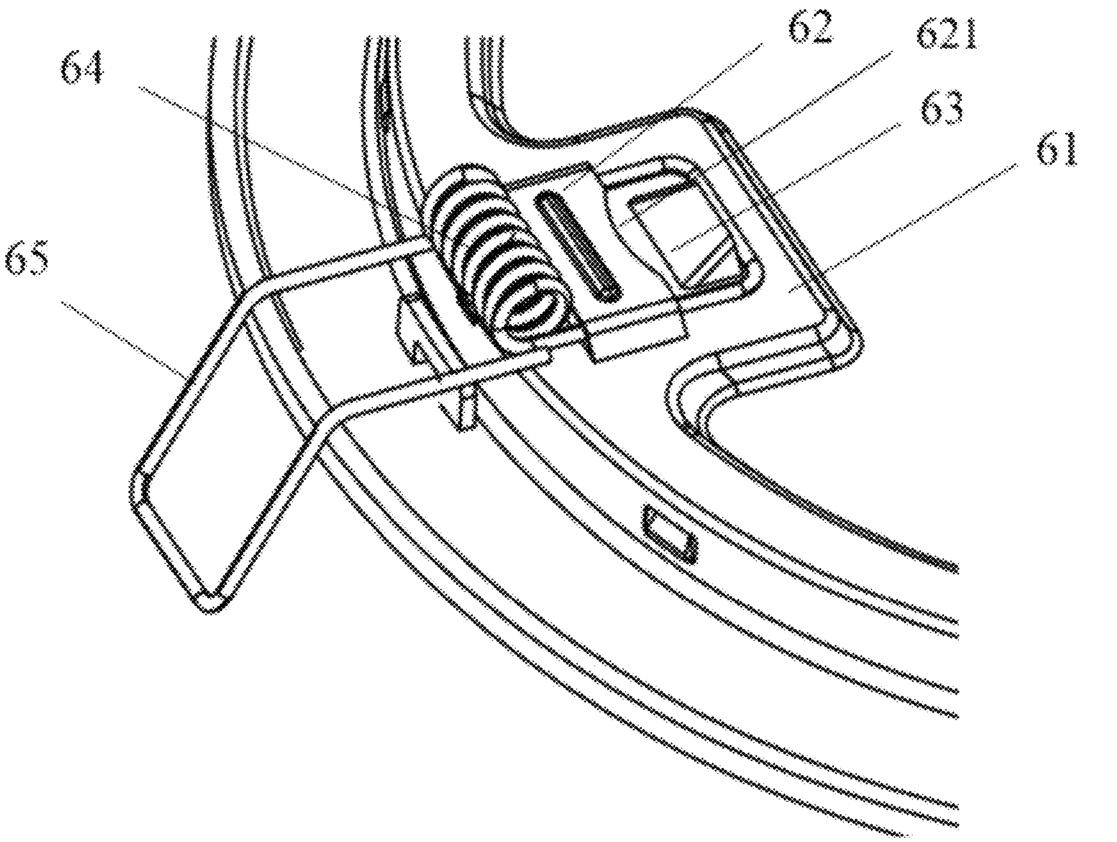
FIG. 5 shows a schematic diagram of the spring fixing structure with an engaged spring according to an embodiment of the present disclosure.

In some embodiments (FIGS. 3-5), at least one pair of spring fixing structures is integrally stamped on the bottom surface of the back cover 1 for installing elastic clamping springs (e.g., butterfly springs or torsion springs), enabling rapid ceiling fixation of the downlight. Each spring fixing structure includes a protrusion portion 61, an insertion tab 62, and a hook 63.

The protrusion portion 61, integrally formed on the bottom surface of the back cover 1, is a strip-shaped protrusion vertically extending from the bottom surface. The length direction of the protrusion portion 61 is parallel to the extension direction of the spring arm 65. Both sidewalls of the protrusion portion 61 connect to the bottom surface through arc-shaped surfaces to enhance bending resistance.

The insertion tab 62 is a metal sheet arranged parallel to the protrusion portion 61. The top end of insertion tab 62 bends toward the protrusion portion 61 to form an arc-shaped guide surface. The gap between the insertion tab 62 and protrusion portion 61 forms an insertion channel for the spring arm 65. The channel entrance is wider than the exit, creating a tapered guide structure.

In some embodiments, an arc-shaped recess 621 is provided near the exit of the insertion channel on the insertion tab 62. The curvature of the arc-shaped recess 621 matches the bending path of the spring arm 65. When the spring arm 65 passes through the insertion channel, the inner wall of the arc-shaped recess 621 maintains continuous contact with the outer side of the spring arm 65, guiding it to move smoothly along the preset bending trajectory to avoid jamming.

The hook 63 is located at the end of the protrusion portion 61 near the insertion channel exit. The spring arm 65 can pass through the insertion channel and engage with the end face of the hook 63, thereby fixing the spring 64 to the back cover 1.

In some embodiments, the hook 63 includes an inclined guide surface 631 and a limiting end face 632. The inclined guide surface 631 slopes upward from the insertion channel exit toward the bottom surface of the back cover 1 at an angle that allows the spring arm 65 to slide naturally under gravity or assembly thrust. A first end of the inclined guide surface 631 is positioned near the bottom surface of the back cover 1, while a second end extends downward to a position adjacent to the insertion channel exit. The limiting end face 632, located at the first end of the inclined guide surface 631, is a plane perpendicular to the bottom surface. The height of the limiting end face 632 matches the thickness of the bent portion of the spring arm 65, forming a surface-contact engagement.

During assembly, the spring arm 65 is pushed into the channel entrance. The spring arm 65 first contacts the arc-shaped guide surface of the insertion tab 62 and the arc-shaped transition portion of the protrusion portion 61, which collaboratively guide the spring arm 65 into self-centering alignment. When the front end of the spring arm 65 contacts the inclined guide surface 631, it slides along the slope until the bent portion snaps into the limiting end face 632.

In this state, the inner wall of the arc-shaped recess 621 maintains continuous contact with the outer side of the spring arm 65, preventing lateral displacement. The engagement between the limiting end face 632 and the bent portion generates normal constraint forces to block axial retraction of the spring 64. The inner wall of the protrusion portion 61 fits against the inner side of the spring arm 65, achieving circumferential fixation.

In this embodiment, the synergistic guidance of the tapered channel, arc-shaped recess, and inclined guide surface enables "push-to-lock" spring installation, enhancing assembly efficiency. The overall height of the spring fixing structure aligns with the back cover's sidewall, eliminating thickness increases caused by traditional standalone spring seats and meeting the ultra-thin height requirements of downlights.

Figure 6:
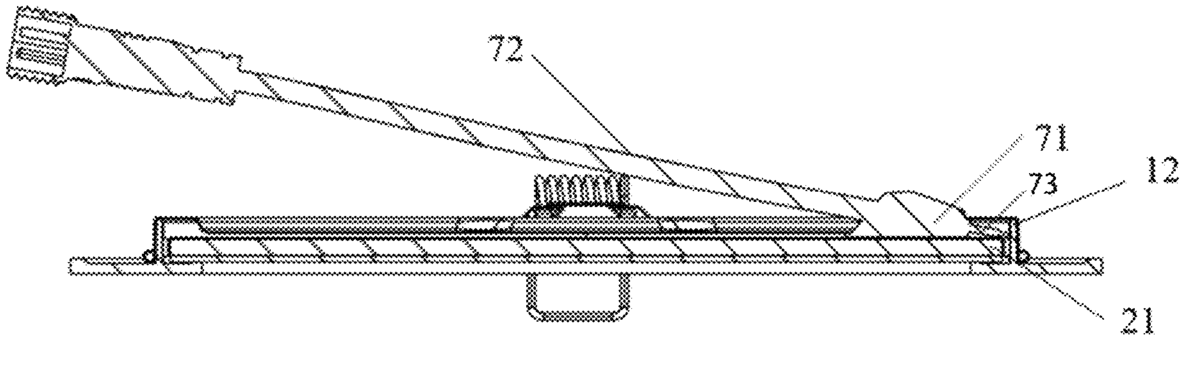
FIG. 6 shows a schematic diagram of a mating cable fixing structure according to an embodiment of the present disclosure.

In some embodiments (see FIG. 6), the downlight further includes a mating cable 7 for connecting external power to the flexible light strip 3. The mating cable 7 includes a rear clamp 71 and a wire body 72. The fixation method of the mating cable 7 is synergistically designed with the assembly structure of the metal back cover 1 and plastic face ring 2.

Specifically, the rear clamp 71 is a plate-shaped component injection-molded from insulating material (e.g., PA66 or PVC). It is embedded in the compression zone 73 between the first annular sidewall 12 of the metal back cover 1 and the second annular sidewall 21 of the plastic face ring 2. When the back cover 1 and face ring 2 are locked via the snap-fit structure, radial compression forces generated between the inner wall of the first annular sidewall 12 and the outer wall of the second annular sidewall 21 clamp the rear clamp 71 in place without requiring additional screws or adhesives.

The wire body 72 extends laterally from the rear clamp 71 in a direction parallel to the downlight's central axis (i.e., horizontal wiring), avoiding height increases caused by traditional vertical wiring. The insulation layer of the wire body 72 is integrally molded with the rear clamp 71, ensuring no direct contact between the wire body 72 and metal back cover 1 for dual insulation protection.

In some embodiments (as shown in FIG. 1), the downlight's optical system includes the flexible light strip 3, a light guide plate 8, and a diffusion plate 9, with the following structural relationships and functions.

The light guide plate 8 is positioned forward of the light-emitting direction of the flexible light strip 3 (i.e., near the fixture opening) and fixed to the inner wall of the second annular sidewall 21 of the face ring 2, converting point light sources into uniform planar illumination.

The diffusion plate 9 is disposed between the flexible light strip 3 and light guide plate 8, fixed to the inner wall of the face ring 2, scattering direct LED light and homogenizing its directional characteristics.

In some embodiments, the downlight further includes reflective paper 10 positioned rearward of the light-emitting direction of the flexible light strip 3 (i.e., near the back cover side) and fixed to the inner wall of the face ring 2.

Exemplarily, the reflective paper 10 is an aluminum-coated PET film that reflects backward-scattered light toward the light guide plate 8 or diffusion plate 9, improving luminous efficacy.

In summary, the downlight of the present disclosure employs a metal back cover enclosing a plastic face ring. The annular sidewalls of the back cover and face ring form surface-contact thermal interfaces, leveraging metal's rapid heat conduction while reducing costs via plastic. Notches on the first annular sidewall of the back cover engage with protrusions on the face ring's sidewall to create dual snap-fit retention, replacing traditional screw fixation. The spring fixing structure achieves self-locking through integrally stamped protrusion portions, insertion tab, and hook, enhancing assembly efficiency. The mating cable's rear clamp is clamped within the compression zone between the back cover and face ring, utilizing radial pressure for fixation, while horizontal wiring minimizes overall height.

Descriptions of the illustrated processes or structures emphasize different aspects across figures. For parts not detailed in a specific figure, refer to related descriptions in other figures.

These embodiments exemplify the principles and efficacy of the present disclosure without limiting its scope. Many modifications and other embodiments of the inventions set forth herein will come to mind to one skilled in the art to which these inventions pertain having the benefit of the teachings presented in the foregoing descriptions and the associated drawings. Modifications and other embodiments are intended to be included within the scope of the appended claims.

What is claimed is:

1. A downlight, comprising a back cover (1), a face ring (2), and a flexible light strip (3); wherein the back cover (1) comprises a bottom surface (11) and a first annular sidewall (12) connected to a periphery of the bottom surface (11), wherein the back cover is made of metal;

the face ring (2) comprises an axially extending second annular sidewall (21), the first annular sidewall (12) surrounds an outer side of the second annular sidewall (21) and contacts an outer wall surface of the second annular sidewall (21), wherein the face ring is made of plastic; and the flexible light strip (3) is fixed to an inner wall surface of the second annular sidewall (21);

wherein a free end of the first annular sidewall (12) is bent outward to form a rolled edge, and the first annular sidewall (12) is provided with multiple spaced notches (4); and an outer wall surface of the second annular sidewall (21) is provided with protrusions (5) corresponding in quantity and position to the notches (4), wherein the protrusions (5) are configured to engage the notches (4) to form a snap-fit connection, thereby fixing the first annular sidewall to the second annular sidewall (21).

2. The downlight of claim 1, wherein the protrusions (5) include a first protrusion (51) and a second protrusion (52); a lower surface of the first protrusion is provided with a horizontal abutment surface to abut against a bottom surface of the corresponding notch (4); and an upper surface of the second protrusion is provided with a horizontal abutment surface to abut against a top surface of the corresponding notch (4).

3. The downlight of claim 2, wherein multiple first protrusions (51) and second protrusions are provided, and the first protrusions and the second protrusions (52) are alternately arranged along a circumferential direction of the second annular sidewall (21), forming a dual snap-fit retention structure.

4. The downlight of claim 1, further comprising at least one pair of spring fixing structures; wherein each of the spring fixing structures comprises a protrusion portion (61), an insertion tab (62), and a hook (63); wherein the protrusion portion (61) is integrally formed on the bottom surface (11) of the back cover (1);

the insertion tab (62) is arranged parallel to the protrusion portion (61), wherein a gap between the insertion tab (62) and the protrusion portion (61) forms an insertion channel; and the hook (63) is disposed at an end of the protrusion portion (61) near an exit of the insertion channel; wherein a spring arm (65) of a spring (64) is configured to pass through the insertion channel and engage an end face of the hook (63), thereby fixing the spring (64) to the back cover (1).

5. The downlight of claim 4, wherein the insertion tab (62) is provided with an arc-shaped recess (621) near the exit of the insertion channel, and wherein a curvature of the arc-shaped recess (621) matches a bending path of the spring arm (65) to guide the spring arm (65) through the insertion channel.

6. The downlight of claim 4, wherein the hook (63) comprises an inclined guide surface (631) and a limiting end face (632); wherein the inclined guide surface (631) extends obliquely from the exit of the insertion channel toward the limiting end face (632), to guide the spring arm (65) to slide along an inclined direction and engage the limiting end face (632).

7. The downlight of claim 1, further comprising a mating cable (7); wherein the mating cable (7) comprises a rear clamp (71) and a wire body (72), wherein the rear clamp (71) is embedded in a compression zone between the first annular sidewall (12) and the second annular sidewall (21) and fixed by a compression force generated between the first annular sidewall (12) and the second annular sidewall (21).

8. The downlight of claim 1, further comprising:

a light guide plate (8) disposed forward of a light-emitting direction of the flexible light strip (3) and fixedly connected to the inner wall surface of the second annular sidewall (21), configured to uniformly guide light emitted by the flexible light strip (3) toward the light-emitting direction; and a diffusion plate (9) disposed between the flexible light strip (3) and the light guide plate (8) and fixedly connected to the inner wall surface of the second annular sidewall (21), configured to scatter and homogenize the light emitted by the flexible light strip (3).

9. The downlight of claim 8, further comprising reflective paper (10) disposed rearward of the light-emitting direction of the flexible light strip (3) and fixedly connected to the inner wall surface of the second annular sidewall (21), configured to reflect backward-scattered light from the flexible light strip (3) toward the light guide plate (8) or the diffusion plate (9).

* * * * *